(12) United States Patent
Desai (10) Patent No.: US 11,803,915 B1
(45) Date of Patent: Oct. 31, 2023

(54) COMPUTING SYSTEM FOR ADAPTIVE INVESTMENT RECOMMENDATIONS

(71) Applicant: Wells Fargo Bank, N.A., San Francisco, CA (US)

(72) Inventor: Chetan Vashrambhai Desai, Buffalo Grove, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/931,940

(22) Filed: May 14, 2020

(51) Int. Cl.
*G06Q 40/06* (2012.01)
*G06Q 30/0201* (2023.01)

(52) U.S. Cl.
CPC ......... *G06Q 40/06* (2013.01); *G06Q 30/0201* (2013.01)

(58) Field of Classification Search
CPC ........................... G06Q 40/06; G06Q 30/0201
USPC .................................................. 705/36 R, 36
See application file for complete search history.

(56) References Cited

U.S. PATENT DOCUMENTS

| | | | |
|---|---|---|---|
| 7,401,040 B2 | 7/2008 | Sloan et al. | |
| 7,783,545 B2 | 8/2010 | Sloan et al. | |
| 7,860,774 B1* | 12/2010 | Peterson | G06Q 40/06 705/36 R |
| 8,165,948 B2 | 4/2012 | O'Shaughnessy et al. | |
| 2017/0213288 A1* | 7/2017 | Zhang | G06Q 40/06 |
| 2019/0205727 A1 | 7/2019 | Lin et al. | |
| 2022/0138856 A1* | 5/2022 | Ahlstrom | G06N 20/00 705/36 R |

FOREIGN PATENT DOCUMENTS

CN  108846758  11/2018

OTHER PUBLICATIONS

Ma, Yilin, Ruizhu Han, and Weizhong Wang. "Portfolio optimization with return prediction using deep learning and machine learning." Expert Systems with Applications 165 (2021): 113973. (Year: 2021).*

(Continued)

*Primary Examiner* — Eric T Wong
*Assistant Examiner* — John O Preston
(74) *Attorney, Agent, or Firm* — Shumaker & Sieffert, P.A.

(57) ABSTRACT

A computer-based adaptive advising system is described that generates a client profile for a client that includes a risk perception matrix. The risk perception matrix includes a familiarity index, an association index, and a sensitivity index, wherein each index indicates a relative weight of corresponding parameters for the client's perception of risk. The system identifies one or more investment recommendations for the client from a pool of potential investments based on the risk perception matrix for the client, and presents the recommendations based at least on association parameters capturing subjects of personal relevance to the client. After receiving an acceptance or rejection for each of the one or more investment recommendation, the system updates the familiarity index, the association index, and/or the sensitivity index based on the accepted invention recommendations and rejected investment recommendations.

18 Claims, 4 Drawing Sheets

(56) References Cited

OTHER PUBLICATIONS

Hao, Ruizhi. Quantitative Trading Portfolio Optimization-Based Stock Prediction Using Long-Short Term Memory Network. Diss. Stevens Institute of Technology, 2021. (Year: 2021).*
Chiu, H. Y. "Transforming the Financial Advice Market—The Roles of Robo-advice, Financial Regulation and Public Governance in the UK." Banking and Finance Law Review 35.1 (2019): 9-35. (Year: 2019).*
Palma-Dos_Reis, A., et al., "Designing personalized intelligent financial decision support systems," Decision Support Systems, 26(1), May 12, 1999, 17 pages.
Tillmans, S. P. A., "Robo-advisors: How can automated investment advice change risk profiling practices?," Master Economics, Financial Economics, Radboud Universiteit, Nov. 29, 2017, 61 pages.
Hakala, K., "Robo-advisors as a form of artificial intelligence in private customers' investment advisory services." School of Business, Aalto University, May 23, 2019, 34 pages.

* cited by examiner

COMPUTING SYSTEM FOR ADAPTIVE INVESTMENT RECOMMENDATIONS

TECHNICAL FIELD

The present disclosure relates to computing systems, and more specifically, computing systems executing artificial-intelligence (AI) models.

BACKGROUND

Financial advisors, such as investment portfolio managers, may recommend one or more investment opportunities, such as stocks, bonds, or other types of security trades to a client. In some cases, a financial advisor may provide the client with an initial questionnaire configured to assess the client's appetite or tolerance for investment risk. Based on the results of the questionnaire, the financial advisor may assign the client to a category indicating the client's tolerance for investment risk. For example, based on the results of the questionnaire, the client may be assigned a numerical value indicating the client's tolerance for risk relative to an average or baseline risk tolerance. The client may then be assigned to a category indicating a number of standard deviations from the average. The financial advisor may then select and recommend investment opportunities by matching the client's risk category to the estimated risk of one or more investments, such as based on a relative volatility of a security's value, or an expected return on investment (ROI).

SUMMARY

In general, this disclosure describes a computer-based adaptive advising system that uses one or more artificial-intelligence-based, machine-learning-based, or deep-learning-based models to evaluate a client's subjective perception of investment risk by generating a set of parameters and indices indicative of different aspects of the client's preferred investment strategy or behavior. The system may then identify a corresponding set of recommended investment opportunities based on the parameters, indices, and/or other information stored in the client's personal investment profile. The client's investment decisions (e.g., an acceptance or a rejection for each of the recommended investments) may then be fed back into the artificial intelligence (AI) models to re-calibrate the parameters indices and further improve the selection of subsequent investment opportunities based on the updated parameters and indices.

Unlike more-traditional "standard deviation of volatility" investment-recommendation methods, the AI-based investment recommendation models described herein may include a more-complex structure, such that any investment recommendation is based on a plurality of factors beyond just the objectively (e.g., quantitatively) estimated "riskiness" of the investment (e.g., the relative volatility of a security, or its projected return-on-investment). For example, the systems and techniques described herein may be configured to determine (e.g., estimate) a client's subjective perception of the riskiness of a given investment opportunity, based on a plurality of distinct personal attributes of the client.

For example, the systems and techniques of this disclosure may include an AI model configured to assess a client's perception of the riskiness of "familiar" securities, such as based on the client's investment history (e.g., the client's past investment decisions and the subsequent performance of those securities). In some examples, an advising system may include an AI model configured to assess the client's perception of the riskiness of securities based on subjects of personal relevance to the client, such as personal interests, familial interests, ethnic, religious, or geographic backgrounds, or other personal attributes of the client. In some examples, an advising system may include an AI model configured to assess a relative sensitivity of the client to various key changes in their investment portfolio, such as accumulation of tax obligations, volatility, the performance of the portfolio relative to one or more portfolio metrics, or a requirement for a minimum regular return-on-investment. By assessing and incorporating multiple different aspects of the client's personal investment preferences, an advising system according to the techniques of this disclosure may be more likely to identify and recommend long-term investment opportunities for the client. For example, the client may be more likely to retain investments he subjectively perceives to be lower-risk for longer periods of time, rather than selling them off in response to a short-term loss in value.

As one example, this disclosure is directed to a method including: generating a client profile for a client that includes a risk perception matrix, the risk perception matrix comprising a familiarity index, an association index, and a sensitivity index, wherein each index indicates a relative weight of corresponding parameters for the client's perception of risk; identifying one or more investment recommendations for the client from a pool of potential investments based on the risk perception matrix for the client; presenting the one or more investment recommendations for the client based at least on association parameters capturing subjects of personal relevance to the client; receiving an acceptance or rejection for each of the one or more investment recommendations; and updating at least one of the familiarity index, the association index, and the sensitivity index based on accepted invention recommendations and rejected investment recommendations.

As another example, this disclosure is directed to a computing system including one or more storage units and one or more processors in communication with the one or more storage units and configured to: generate, using one or more computer-based models, a client profile for a client that includes a risk perception matrix, the risk perception matrix comprising a familiarity index, an association index, and a sensitivity index, wherein each index indicates a relative weight of corresponding parameters for the client's perception of risk; identify one or more investment recommendations for the client from a pool of potential investments based on the risk perception matrix for the client; present the one or more investment recommendations for the client based at least on association parameters capturing subjects of personal relevance to the client; receive an acceptance or rejection for each of the one or more investment recommendations; and update at least one of the familiarity index, the association index, and the sensitivity index based on accepted invention recommendations and rejected investment recommendations.

In a further example, this disclosure is directed to a computer readable medium comprising instructions that when executed cause one or more processors to generate, using one or more computer-based models, a client profile for a client that includes a risk perception matrix, the risk perception matrix comprising a familiarity index, an association index, and a sensitivity index, wherein each index indicates a relative weight of corresponding parameters for the client's perception of risk; identify one or more investment recommendations for the client from a pool of potential investments based on the risk perception matrix for the client; present the one or more investment recommendations for the client based at least on association parameters capturing subjects of personal relevance to the client; receive an acceptance or rejection for each of the one or more investment recommendations; and update at least one of the familiarity index, the association index, and the sensitivity index based on accepted invention recommendations and rejected investment recommendations.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
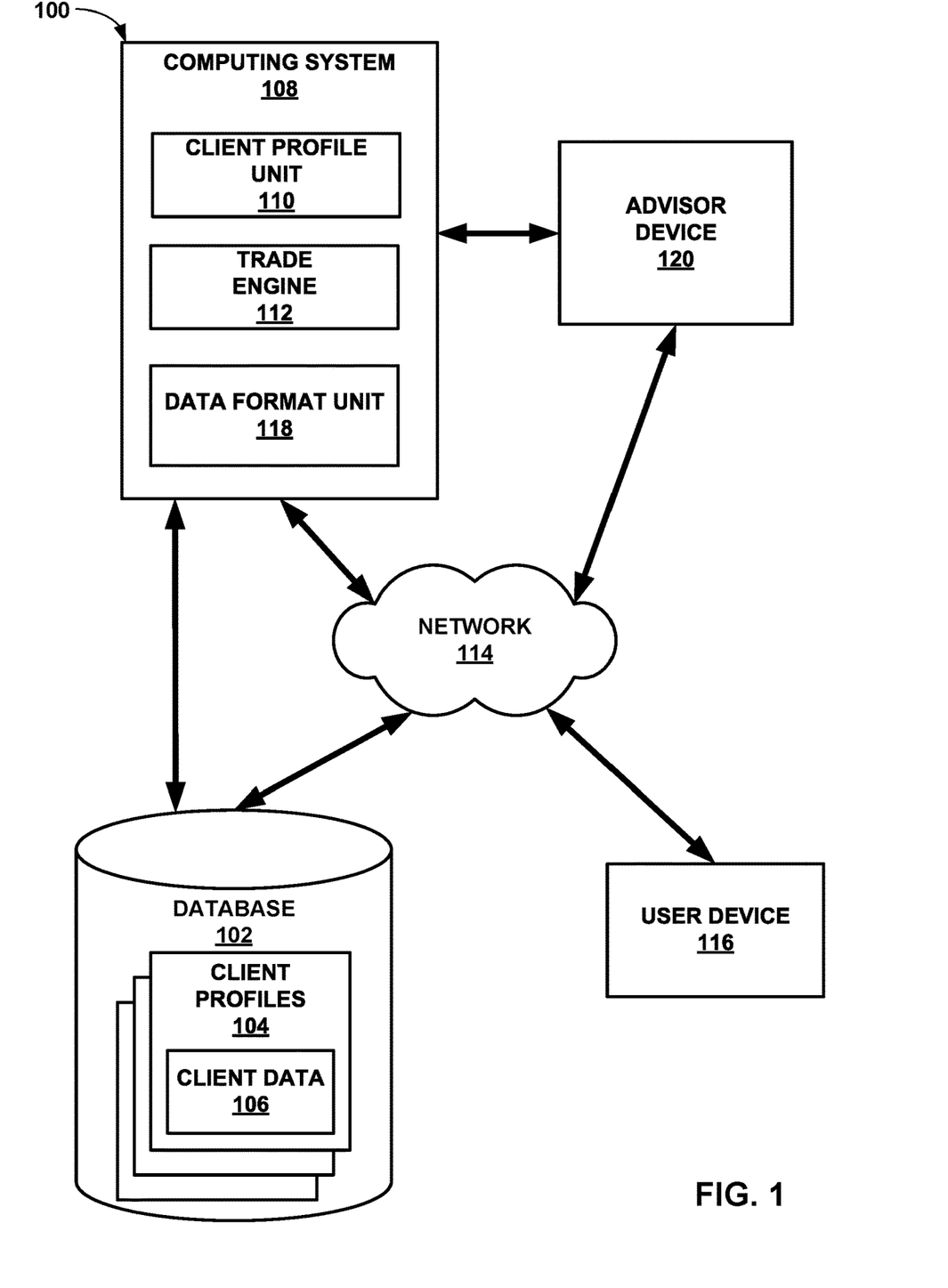
FIG. 1 is a block diagram illustrating an example adaptive advising system, in accordance with the techniques of this disclosure.

FIG. 1 is a block diagram illustrating an example adaptive advising system 100, in accordance with techniques of this disclosure. As shown in FIG. 1, adaptive advising system 100 includes a database 102, a computing system 108, user device 116, and advisor device 120, all connected via an intermediate network 114. In some examples, either or both of database 102 and advisor device 120 may be part of computing system 108, as indicated by the direct connections between those elements. In other examples in accordance with this disclosure, advising system 100 may include additional, fewer, or different components.

A financial advising institution may use a computing system 108, including one or more computing devices (e.g., advisor device 120), servers, memory units, network devices, or the like, to conduct business operations. For example, computing system 108 may comprise a cluster of one or more computers, workstations, servers, and the like. Computing system 108 may be physically or virtually included within an internal network of the financial institution. Alternatively, computing system 108 may be physically or virtually included in a network hosted by a third-party vendor. Computing system 108 may communicate between devices internal to the system (e.g., database 102 and/or advisor device 120) and/or devices external to the system (e.g., user device 116) via network 114. Network 114 may comprise a private network including, for example, a private network associated with an organization, or may comprise a public network, such as the Internet. Although illustrated in FIG. 1 as a single entity, in other examples network 114 may comprise a combination of public and/or private networks.

In accordance with some examples of this disclosure, computing system 108 is configured to collect or receive data regarding a client of the advising institution, and based on the client data, select and recommend one or more investment opportunities for the client.

In some examples, computing system 108 may be configured to receive client data in the form of answers to a questionnaire. For example, computing system 108 may generate or receive data representative of a user interface (UI) (e.g., a graphical user interface, or GUI) for an initial questionnaire. The client may use user device 116 to access computing system 108 via network 114 and an application (e.g., an internet browser) to present the questionnaire UI to the user based on the questionnaire data received from computing system 108. Computing system 108 then receives client data representative of answers to the questionnaire from the user via the UI displayed on the user device 116. In another example, the client may work with a human advisor, such as during an advisement meeting with the advisor from the institution, to answer the questions on the questionnaire UI via advisor device 120. In some examples, the questionnaire may request client data such as investment goals, strategies, capital amounts, or other personal client data. The questionnaire may also request data indicating past investment transactions for the client. In other examples, the client may provide historical investment data to computing system 108 through separate means (e.g., by submitting the data, linking profile accounts, etc.). Computing system 108 may be configured to store the received client data in database 102, as detailed further below.

Based on the received client data, computing system 108 may be configured to determine (e.g., select, identify, generate) one or more customized investment recommendations for the client. As shown in FIG. 1, computing system 108 includes one or more functional units configured to perform techniques in accordance with this disclosure. For example, computing system 108 may include client profile unit 110, trade engine 112, and data format unit 118. As described further with respect to FIG. 2 below, client profile unit 110 may include one or more sub-units configured to retrieve the client data 106 and generate, based on the client data, a unique client profile 104 for each client of the institution. For example, a client profile 104 may include a set of data, such as a risk-perception matrix, configured to assess the client's subjective perception of investment risk. The term "matrix" as used herein, may describe a structured multi-dimensional array of data, such as a set of parameters and/or other values. For example, a risk-perception matrix of a client profile may include ordered sets of descriptive parameters and indices configured to represent (e.g., capture or describe) various different aspects of the client's psychology with regard to investment behavior.

As one example, a set of parameters may indicate one or more securities with which a client is familiar, based on previous interactions (e.g., investment transactions) with the security. The parameters may also indicate an estimation of the client's relative perception of that security (e.g., positive, negative, or neutral perceptions), for example, based on the performance of the historical transactions.

In some examples, another set of parameters may indicate subjects of personal relevance or interest to, or associated with, the client. In some examples, the client himself may not even be consciously aware of a subject of personal interest that a machine-learning algorithm may identify through a pattern manifesting in the client's investment behavior. Accordingly, a list of potential client associations may be virtually limitless. However, some non-limiting examples of these types of personal associations may include a commercial field (e.g., banking, energy, social media, construction), a geographic region, or even an individual, such as a CEO of a corporation. The parameters may also indicate a relative strength of each association, for example, indicating an amount of interest the client has for each respective subject.

In some examples, another set of parameters may indicate one or more preferences or constraints on investment transactions for the client. For example, the parameters may indicate a sensitivity (e.g., a desirability) of the client with respect to tax obligations, objective monetary risks, or other an expected performance of the client's stock portfolio.

In some examples, the sub-units of client profile 110 may include one or more artificial intelligence models or machine-learning-based algorithms configured to generate these parameters and/or other aspects of the client profile. In general, a computing system uses a machine-learning algorithm to build a model based on a set of training data such that the model "learns" how to make predictions, inferences, or decisions to perform a specific task without being explicitly programmed to perform the specific task. Once trained, the computing system applies or executes the trained model to perform the specific task based on new data. Examples of machine-learning algorithms and/or computer frameworks for machine-learning algorithms used to build the models include a linear-regression algorithm, a logistic-regression algorithm, a decision-tree algorithm, a support vector machine (SVM) algorithm, a k-Nearest-Neighbors (kNN) algorithm, a gradient-boosting algorithm, a random-forest algorithm, or an artificial neural network (ANN), such as a convolutional neural network (CNN). For example, a gradient-boosting model may comprise a series of trees where each subsequent tree minimizes a predictive error of the preceding tree.

Returning to the example of FIG. 1, computing system 108 may use one or more of these types of machine-learning algorithms to generate a respective index for each set of parameters, indicating the relative weight (or "importance") of that corresponding set of parameters relative to the other sets of parameters when selecting investment opportunities. For example, a high "familiarity" index may indicate that the client strongly prefers to conduct transactions with securities that are the same or substantially similar to those with which he has conducted previous transactions. A high "association" index may indicate that the client strongly prefers to conduct transactions based on his personal interests, rather than an expected performance of the portfolio. A high "sensitivity" index may indicate that the client strongly prefers to conduct transactions based on the expected return-on-investment (ROI) or other similar portfolio performance constraints.

By quantifying various different aspects of the client's personal investment preferences, computing system 108 (e.g., trade engine 112) may be more likely to identify and recommend long-term investment opportunities for the client. For example, the client may be more likely to retain investments he subjectively perceives to constitute a relatively lower risk for longer periods of time, rather than selling them off in response to a short-term loss in value. Accordingly, the techniques of this disclosure may provide for increased long-term client profitability.

Computing system 108 may store the client profile 104, including the risk perception matrix (e.g., the parameters and/or the indices), within database 102. As detailed further below, trade engine 112 may then determine (e.g., identify), based on the data contained within client profile 104, a set of customized recommended investment opportunities for the respective client. Data format unit 118 may be configured to customize the visual formatting of the recommended investment opportunities. For example, data format unit 118 may arrange (e.g., order) the investment opportunities based on the parameters and/or indices of the client profile 104. In some examples, data format unit 118 may determine an amount of information (e.g., technical financial details) to include with the recommended investments based on an intended viewer. For example, an expert financial advisor may be more familiar with more technical and complicated details, whereas a casual investment client may choose to view the recommendations in a more encapsulated format. Data format unit 118 may output the investment recommendations for display on a computing device, such as user device 116 or advisor 120. For example, as described above with respect to the questionnaire, computing system 108 may generate a UI that the client and/or a financial advisor may use to view the recommended investments and indicate (e.g., input) either an acceptance or a rejection for each investment opportunity. Computing system 108 may receive the acceptances and rejections (and in some examples, additional contextual data from the client) and feed them back into client profile unit 110, which may update the client profile (e.g., the parameters and indices) for subsequent investment recommendations.

Database 102 may be a data structure for storing data related to the computing system 108 including one or more client profiles 104. Database 102 may be stored by any suitable party and in any suitable location according to particular needs. For example, database 102 may be stored and maintained by the financial advising institution that includes computing system 108, another institution associated with system 100, or by a third-party vendor that stores and maintains data. Although illustrated as a single database 102, any suitable number of databases may be used for storing the data described according to particular needs. Although shown as being separate from computing system 108, in certain examples, database 102 may be stored and executed within a computing device of computing system 108. As one example, database 102 may be managed by a financial advising or wealth management agency that manages the financial investments of a plurality of clients.

User device 116 may include a computing device with data input/output capabilities, such as a personal computer, laptop, smartphone, tablet, or the like. For example, a respective client may use user device 116 to input personal client data 106 that computing system 108 may use to generate a custom user profile. For example, the client may use user device 116 to answer an initial questionnaire regarding personal investment preferences, historical investments, and other unique personal information. In some examples, the client may use user device 116 to view recommended investment opportunities determined by computing system 108, and to select (e.g., accept or reject) from among the various investment options.

Figure 2:
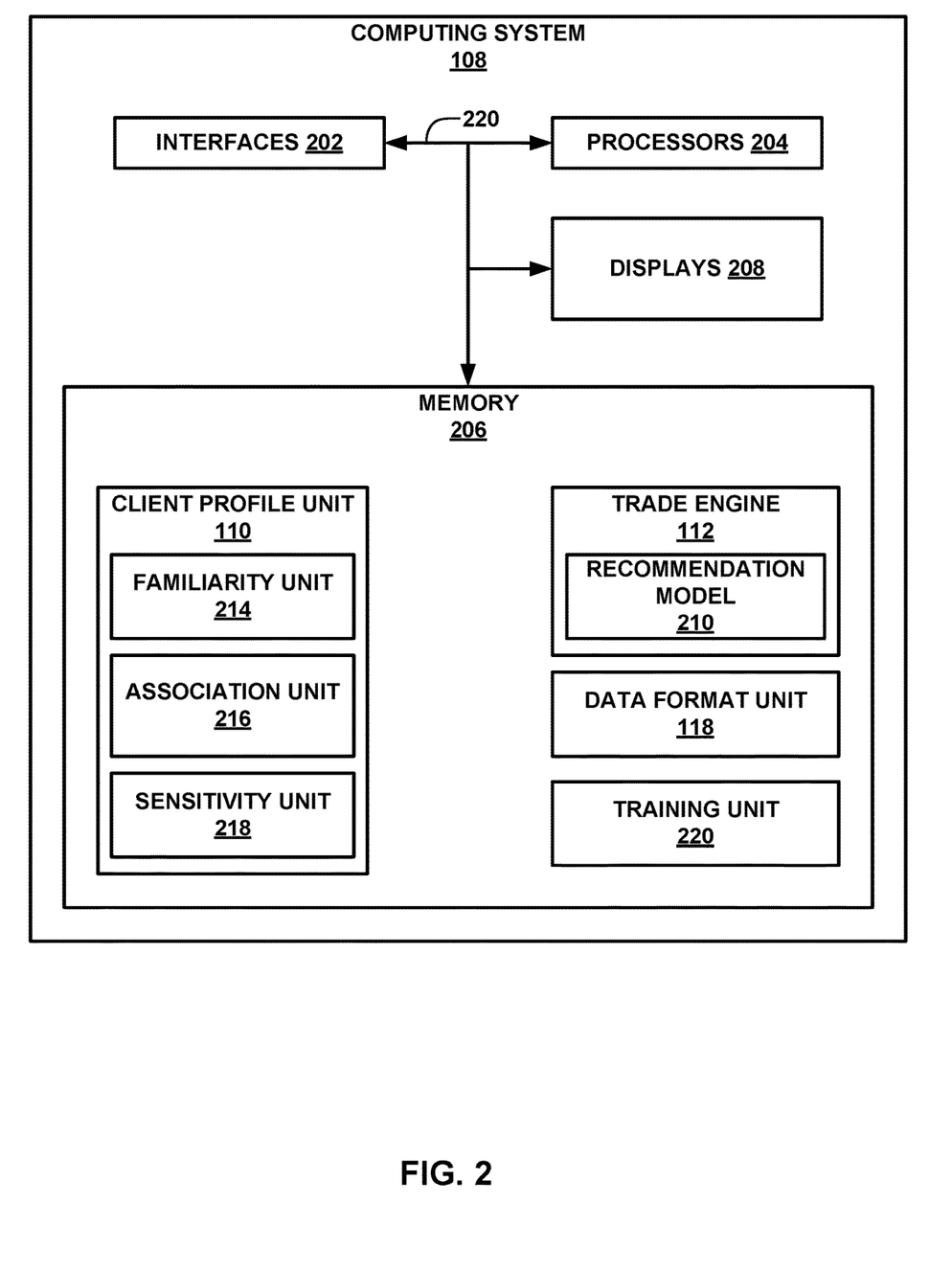
FIG. 2 is a block diagram illustrating an example computing system of the adaptive advising system of FIG. 1, in accordance with the techniques of this disclosure.

FIG. 2 is a block diagram illustrating an example of computing system 108 of FIG. 1, in accordance with the techniques of this disclosure. The architecture of computing system 108 illustrated in FIG. 2 is shown for exemplary purposes only. Computing system 108 should not be limited to the illustrated example architecture. In other examples, computing system 108 may be configured in a variety of ways.

Computing system 108 is configured to receive data regarding a client's investment and personal preferences, as well as expert financial advice, and apply one or more algorithms to generate a client profile 104 (FIG. 1). The functions of computing system 108 may be implemented via any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 108 represents a cloud computing system, server farm, and/or server cluster (or portion thereof) that provides services to client devices and other devices or systems. In other examples, computing system 108 may represent or be implemented through one or more virtualized compute instances (e.g., virtual machines, containers) of a data center, cloud computing system, server farm, and/or server cluster.

As shown in the example of FIG. 2, computing system 108 includes one or more processors 204, one or more interfaces 202, and memory 206. Computing system 108 also includes client profile unit 110, trade engine 112, data format unit 118, and training unit 220, any or all of which may be implemented as program instructions and/or data stored in memory 206 and executable by processors 204. Memory 206 may also store an operating system (not shown) executable by processors 204 to control the operation of components of computing system 108. The components, units, or modules of computing system 108 are coupled (physically, communicatively, and/or operatively) using communication channels 220 for inter-component communications. In some examples, the communication channels 220 may include a system bus, a network connection, an inter-process communication data structure, or any other method for communicating data.

Processors 204, in one example, may comprise one or more processors that are configured to implement functionality and/or process instructions for execution within financial advising system 108. For example, processors 204 may be capable of processing instructions stored by memory 206. Processors 204 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Computing system 108 may utilize interfaces 202 to communicate with external systems via one or more networks, e.g., network 114 from FIG. 1. Interfaces 202 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, computing system 108 utilizes interfaces 202 to wirelessly communicate with external systems, e.g., database 102 and/or user device(s) 116 from FIG. 1.

Memory 206 may be configured to store information within computing system 108 during operation. Memory 206 may include a computer-readable storage medium or computer-readable storage device. In some examples, memory 206 include one or more of a short-term memory or a long-term memory. Memory 206 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, memory 206 is used to store program instructions for execution by processors 204. Memory 206 may be used by software or applications running on financial advising system 108 (e.g., client profile unit 110, trade engine 112, data format unit 118, and/or training unit 220) to temporarily store information during program execution. For example, as described further below, memory 206 may store client parameters and index values during execution of trade engine 112.

In the example of FIG. 2, client profile unit 110 includes familiarity unit 214, association unit 216, and sensitivity unit 218 configured to determine or generate data for client profile 104, such as a client risk-perception matrix including a familiarity matrix (e.g., a set of familiarity parameters) and a familiarity index, an association matrix (e.g., a set of association parameters) and an association index, and a sensitivity matrix (e.g., a set of sensitivity parameters) and a sensitivity index. According to the techniques described in this disclosure, each of familiarity unit 214, association unit 216, and sensitivity unit 218 may include a machine-learning algorithm or framework configured to be executed by processors 204. For example, each of units 214, 216, and 218 may be built using a gradient-boosting algorithm, a random-forest algorithm, an ANN such as a CNN, or other models such as those detailed further above. Training unit 220 is configured to train the machine-learning algorithms or framework of the models to make predictions, inferences, or decisions to determine or generate data for client profile 104, such as the familiarity index, the association index, and the sensitivity index. For example, training unit 220 may train the one or more machine-learning algorithms based on training data generated from historical investment data for a general population of clients.

For example, client profile unit 110 may initially apply client data, including at least the initial client questionnaire and an investment history of the client, to familiarity unit 214. Based on the client data, familiarity unit 214 may generate a set of familiarity parameters describing (e.g., listing and/or ranking) a set of securities with which a client is familiar (e.g., has experience from past investment transactions). For example familiarity unit 214 may rank the familiarity of the client's previous portfolio securities based on an amount of money invested, a duration of investments, and/or a number of discrete investment events with each security. In some examples, familiarity unit 214 may rank the client's familiarity with a past security based on its performance. For example, familiarity unit 214 may assign a relatively high familiarity ranking to a security that performed well (e.g., increased in value) after the client purchased it. As another example, familiarity unit 214 may assign a relatively low familiarity ranking to a security that performed poorly (e.g., decreased in value) after the client sold it, representing the client's perception that it was a wise investment decision to sell the security and not to recommend that security again in the future.

Additionally, familiarity unit 214 may include an AI model configured to generate, based on the client data and/or the familiarity parameters, an initial (e.g., default) familiarity index indicating the client's relative tendency to invest in "familiar" securities as a preferred investment strategy. For example, familiarity unit 214 may determine whether the client's investment history frequently involved repeatedly investing in a finite set of securities, or alternatively, if the client displayed a tendency (e.g., a pattern) to regularly invest in securities that were new to the client.

As another example, client profile unit 110 may apply client data, including at least a client questionnaire and an investment advising discussion with the client, to association unit 216. For example, through the questionnaire and/or an advising discussion, the client may indicate one or more personal attributes and/or interests. Based on the client data, association unit 216 may generate a set of association parameters describing (e.g., listing and/or ranking) the client-indicated personal attributes or interests. In some examples, association unit 216 may initially rank the attributes or interests based on a client-indicated ranking, such as via the questionnaire. In other examples, association unit 216 may search for ranking keywords within a record of the advising meeting (e.g., recorded audio of client comments, or textual notes taken by the investment advisor). For example, association unit 216 may search for keywords indicating a relative amount of interest, such as "really like," "very interested in," or similar comments by the client. In other examples, association unit 216 may search for patterns within the client's investment history indicating subjects of personal interest. As noted above, the possible categories of such subjects may be virtually limitless, but may include, as some non-limiting examples, commercial fields, geographic regions, technology areas, religious beliefs, diversity, or any other topic of interest to the client.

Additionally, association unit 216 may include an AI model configured to generate, based on the client data, an initial (e.g., default) association index indicating the client's relative tendency to invest in securities based on personal associations as a preferred investment strategy. For example, association unit 216 may determine whether the client's investment history indicates frequent investments into one or more common subject areas (a relatively high association index), or alternatively, if few discernable patterns immediately emerge (a relatively low association index).

As a further example, client profile unit 110 may apply client data, including at least the initial client questionnaire, to sensitivity unit 218. For example, through the questionnaire and/or an advising discussion, the client may indicate one or more investment strategy preferences, including an appetite for or sensitivity to investment risk. For example, the client may indicate through the questionnaire a preference not to accumulate tax obligations (e.g., capital gains tax) as a result of making frequent trades, at the risk of a security losing value. In some examples, the client may indicate expectations for the performance of his portfolio. For example, a client may indicate a personal tolerance for a poorer-than-expected performance (e.g., a "relative downside") for a security or portfolio, but only up to a designated threshold. Based on the client data, sensitivity unit 218 may generate a set of sensitivity parameters describing (e.g., listing and/or ranking) the client-indicated investment preferences. In some examples, sensitivity unit 218 may initially rank each of the preferences via the questionnaire.

Additionally, sensitivity unit 218 may include an AI model configured to generate an initial (e.g., default) sensitivity index based on the average sensitivity index among clients having similar profiles. Sensitivity unit 218 may later update the sensitivity index based on the client's subsequent investment decisions, as detailed further below.

Based on the information stored in the client profile (e.g., the sets of parameters and the respective indices), trade engine 112 is configured to select, from a pool of potential investment opportunities, a customized set of recommended investments for the client. In some examples, but not all examples, trade engine 112 includes a machine-learning-based recommendation model 210 configured to generate the set of recommendations for the client. In other examples, trade engine 112 does not include a machine-learning-based recommendation model. In such examples, trade engine 112 may "narrow down" a pool of potential investment opportunities based on the client profile. For example, trade engine 112 may generate the set of recommendations by comparing aspects (e.g., projected ROI, economic field of the security, name of the security, or any other publicly available information) of investment opportunities within the pool to the parameters and indices of the client profile. Once trade engine 112 has determined a set of investment recommendations, data format unit 118 may customize the data output to a particular indicated or intended viewer and output the information to interfaces 202. For example, data format unit 118 may include more technical details for each investment opportunity in scenarios in which the output is intended to be viewed by an expert advisor, as compared to scenarios in which the output is to be viewed directly by the non-expert client. In some examples, data format unit 118 may organize and present the investment recommendations based on data from the client profile. For example, data format unit 118 may identify one or more client associations of the association parameters within one or more of the investment recommendations. In such examples, data format unit 118 may arrange the investment recommendations based on the relative rankings of the one or more associations within the association matrix. For example, data format unit 118 may arrange the investment recommendations to put securities including strong client associations near the top of the list. Additionally or alternatively, data format unit 118 may "tag" one or more of the investment recommendations with a reason or justification for the recommendation based on an identified association. For example, data format unit may append a statement to an investment recommendation, such as "We recommend this investment because you have shown an interest in renewable energy."

Similarly, data format unit 118 may arrange and/or present the investment recommendations based on the client familiarity and/or the client sensitivity data. For example, if the client profile includes a relatively high familiarity index and the recommendations include a particularly familiar security, data format unit 118 may tag that security with a statement such as "We recommend this investment because you are familiar with this security and you have shown a strong interest in investing with familiar securities." As another example, data format unit 118 may tag a security with a statement based on the sensitivity data, such as, "We recommend this investment because of its projected performance, based on your indicated investment strategy preferences."

The client and/or the client's financial advisor (e.g., acting on behalf of the client) may select (e.g., accept or reject) each of the recommended investments via interfaces 202. The client's selections, including both acceptances and rejections, may be stored in the client profile and fed back into units 214, 216, 218 of computing system 108 to generate updated values for the parameters and indices for subsequent investment recommendation sessions.

For example, accepted investments may include one or more securities that are entirely new to the client. Those new securities may now be considered to be "familiar" to the client to at least some degree. Accordingly, familiarity unit 214 may update the familiarity parameters to include these new securities. Similarly, familiarity unit 214 may increase the relative ranking for already-familiar securities that were also included in the most-recent round of accepted investments. Based on the acceptances and rejections, familiarity unit 214 may also update (e.g., increase or decrease) the familiarity index. For example, familiarity unit 214 may increase the familiarity index if the client primarily accepted already familiar securities and/or rejected unfamiliar securities. Similarly, familiarity unit 214 may decrease the familiarity index if the client primarily accepted unfamiliar securities and/or rejected investments for very-familiar securities.

As another example, association unit 216 may use both the accepted investments and the rejected investments to update the association parameters. For example, association unit 216 may identify new investment patterns, or confirm preexisting investment patterns, based on the accepted recommendations. Accordingly, association unit 216 may increase the relative ranking for confirmed patterns within the association parameters. Association unit 216 may also reject a previously identified pattern (e.g., identify a break from or a contradiction to a previously identified pattern). Accordingly, association unit 216 may reduce the relative ranking for that pattern within the association parameters. Based on the acceptances and rejections, association unit 216 may also update (e.g., increase or decrease) the association index. For example, association unit 216 may increase the association index if the client primarily accepted already securities in accordance with previously identified association patterns. Similarly, association unit 216 may decrease the association index if the client primarily accepted securities contrary to previously identified association patterns. In some examples, the association parameters may be updated less frequently than the other two sets of parameters. For example, association unit 216 may be configured to identify investment behavior patterns that surface or manifest over the course of multiple rounds of investment advising sessions, for example over the course of a year or longer.

In some examples, sensitivity unit 218 may use both the accepted investments and the rejected investments to update the sensitivity parameters. For example, sensitivity unit 218 may determine that rejected recommendations indicate an unacceptable level (e.g., an above-threshold level) of investment risk for the client. Accordingly, sensitivity unit 218 may increase the relative ranking for sensitivity parameters that indicate client investment-strategy preferences in accordance with rejected recommendations. Sensitivity unit 218 may also reduce a relative ranking for a sensitivity parameter if the client rejected one or more recommendations that would have otherwise conformed to the investment strategy preferences. Based on the acceptances and rejections, sensitivity unit 218 may also update (e.g., increase or decrease) the sensitivity index. For example, sensitivity unit 218 may increase the sensitivity index if the client primarily accepted and/or rejected recommendations in accordance with the existing sensitivity parameters. Similarly, sensitivity unit 218 may decrease the sensitivity index if the client primarily accepted and/or rejected securities contrary to the sensitivity parameters. In some examples, the sensitivity parameters may be updated more frequently than the other two sets of parameters. For example, the sensitivity parameters may be updated during every investment advising meeting (e.g., quarterly), based on the rejected recommendations. In some examples, but not all examples, the indices may be selected to sum to a fixed value, such that an increase in one index during an update must be balanced by a corresponding decrease in the other indices.

Once units 214, 216, 218 have updated their respective parameters and indices, trade engine 112 may select a new set of investment recommendations, such as during a subsequent investment advising session with the client's investment advisor.

Figure 3:
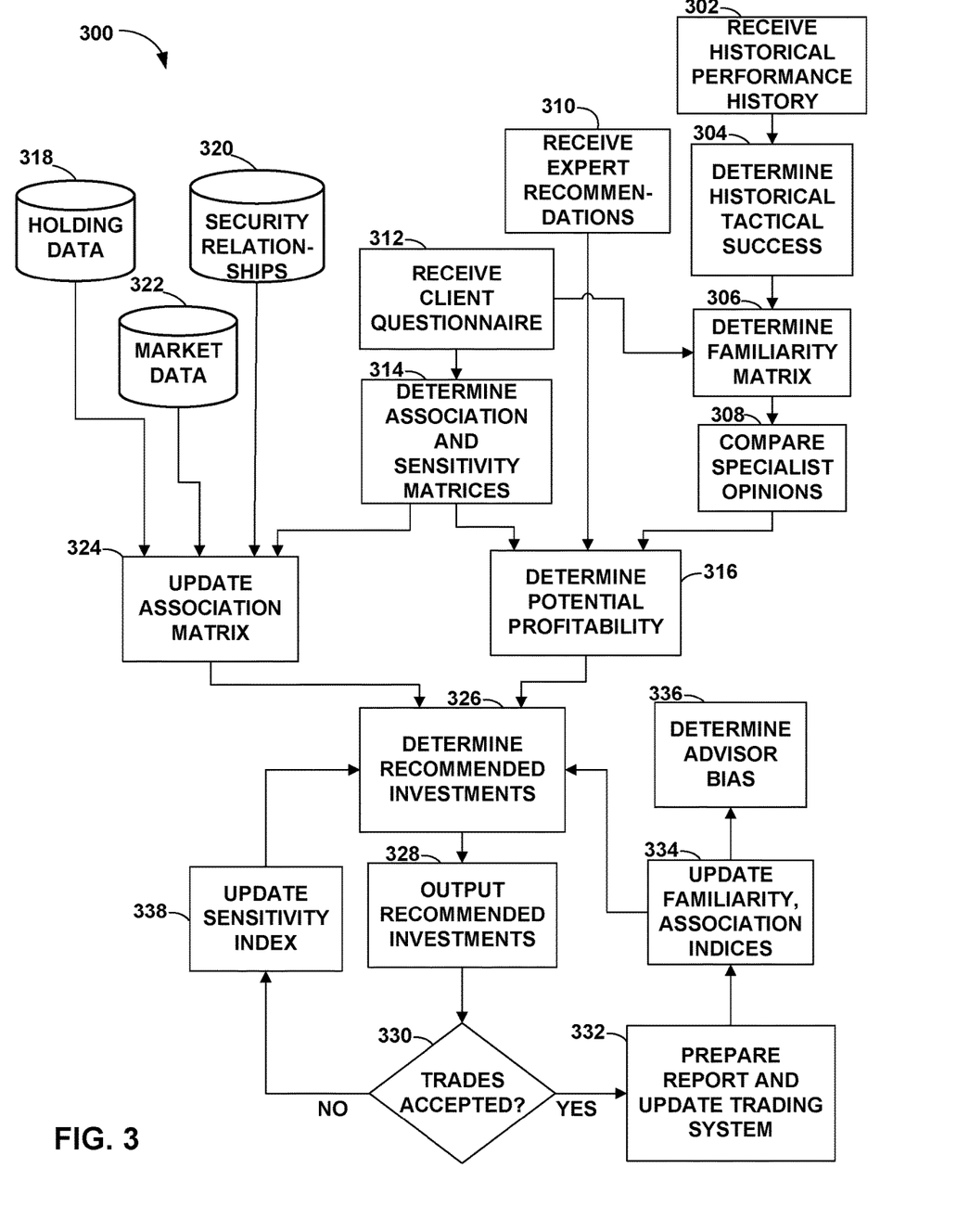
FIG. 3 is a conceptual diagram illustrating an example adaptive advising system, in accordance with techniques of this disclosure.

FIG. 3 is a conceptual diagram illustrating an example adaptive advising system 300, in accordance with techniques of this disclosure. Advising system 300 may be an example of advising system 100 of FIG. 1. Advising system 300 may include a computing system (e.g., computing system 108 of FIGS. 1 and 2) configured to receive a plurality of data inputs indicative of a client's investment strategy, psychology, and/or behavior, as well as other personal traits and attributes unique to the individual client. For example, advising system 300 may receive data indicative of a historical performance history of past investment activities attributable to the client (302). For example, the historical performance history may include a list of past investment purchases, trades, and sales transactions conducted by or on behalf of the client. The list may include an indication of the particular securities involved and the dates and values of each transaction. The historical performance history may also include an indication of a subsequent relative performance (e.g., a gain or loss in value) of the securities during a predetermined time period beginning immediately after each transaction.

Based on the client's historical performance history, system 300 may determine or assess the client's historical tactical success for each security (304). For example, system 300 may generate and store a historical tactical success matrix configured to capture an estimation of the client's subjective perception of each security based on the security's subsequent performance after a transaction by the client. As one example, if the client purchased a security and the security subsequently increased in value, the client may perceive that purchasing this security is a wise investment. Similarly, if the client sold a security and the security subsequently decreased in value, the client may perceive this security to be an unwise investment. In more complex examples, such as when the client bought a security and the security subsequently decreased in value (or similarly, sold a security that subsequently increased in value), system 300 may further determine the client's relative tactical success for that security based on a number of other factors, such as other transactions involving that same security, or the relative magnitude of the subsequent change in value.

Based on the historical tactical success matrix and the client questionnaire detailed further below, system 300 may determine (e.g., generate) a familiarity matrix for the client (306). The familiarity matrix may include, for example, a ranked list of securities with which the client has previously conducted investment transactions. The relative ranking for each security may represent the nature of the relationship between the client and the particular security. For example, system 300 may determine that securities with which the client has been particularly successful may be perceived by the client to be subjectively less risky. Accordingly, system 300 may assign a higher relative ranking to those securities within the familiarity matrix. Similarly, system 300 may determine that securities with which the client has conducted the most transactions and/or invested the most capital may be perceived by the client to be subjectively less risky. Accordingly, system 300 may assign a higher relative ranking to those securities within the familiarity matrix. For example, if a client has bought and sold the same security multiple times, this may indicate that the client is familiar with the growth and loss cycles of that security. Conversely, system 300 may assign a lower relative ranking to securities that have lost value for the client, as well as securities with which the client has conducted the fewest transactions. Based on the familiarity matrix, system 300 may also generate a familiarity index. The familiarity index may include a relative weight, such as a single numerical value or qualitative value (e.g., high, medium, low, etc.), configured to represent the overall likelihood or tendency of the client to invest in more-familiar securities as an investment strategy, as indicated by past transactions, or as indicated directly by the client via the client questionnaire.

In some examples, system 300 may compare the generated familiarity matrix to current investment specialist opinions indicating, for example, the projected return-on-investment and/or the estimated risk for each security (308). For example, system 300 may compare the client's perception (e.g., the relative ranking) of each security within the familiarity matrix to the most-recently updated available data regarding the projected outlook for that security. If financial specialist opinions coincide with the client's perception of a security, e.g., both consider the security to be a wise or profitable investment, system 300 may generate and store a high recommendation ranking for that security. Similarly, if financial specialist opinions coincide with the client's perception that a security is an unwise investment, system 300 may generate and store a low recommendation ranking for that security. In examples in which specialists' opinions of a security conflicts with the client's perception of the security, system 300 may generate and store a relative recommendation ranking for the security based on which factor indicates a "stronger" opinion of the security. For example, if the familiarity matrix reflects a mildly positive perception of a security, but the specialist opinions consider the security to be a significantly unwise investment, system 300 may generate and store a low recommendation ranking for that security.

In some examples, system 300 may be configured to receive and store data indicative of expert financial advice for various aspects of an investment portfolio (310). For example, in addition to receiving specialist opinions of securities with which the client is already familiar (308), system 300 may also receive recommendations from an expert "securities" team indicating the "best" (e.g., most-profitable) and/or "worst" (e.g., least-profitable) investments overall. Similarly, system 300 may receive recommendations from an expert "funds" team indicating one or more mutual funds, for example. Additionally or alternatively, system 300 may receive recommendations from an expert asset-allocation team indicating a recommended mix of asset classes for a portfolio. For example, the asset-allocation team may provide expert advice indicating how much of a portfolio should be allocated to equity, how much should be allocated to fixed income, etc.

In some examples, system 300 is configured to receive data from a new investment client, indicative of the client's own investment goals, preferences, and/or strategies, or other personal interests (312). For example, a new client may be provided with a questionnaire configured to assess (e.g., determine) the client's tolerance for the relative volatility of a stock portfolio. Typical financial advising systems may use the questionnaire to categorize the client along a spectrum between "aggressive" investment (e.g., high tolerance for volatility) and "conservative" investment (e.g., low tolerance for volatility). In some examples in accordance with this disclosure, the questionnaire may additionally be configured to assess additional client preferences, such as the client's expectations for the relative performance of an investment, or the client's sensitivity to accumulation of tax obligations. In some examples, the client's expectations for the relative performance may be determined relative to the advisor's other portfolios or relative to projections of a stock market index. Accordingly, the client may indicate a constraint that they will not tolerate (e.g., are sensitive to) their portfolio having a relative downside compared to these metrics. In some examples, the client may indicate through the questionnaire personal attributes, such as subjects of personal interest to the client, sources of wealth of the client, moral values of the client, geographic regions associated with the client, personal beliefs of the client, or social identifications of the client.

Based on the data contained in the questionnaire, system 300 may be configured to generate an association matrix and a sensitivity matrix for the client (314). For example, the sensitivity matrix may include sensitivity parameters listing information derived from the client questionnaire indicating the client's sensitivity to security volatility, the client's sensitivity to the relative performance of securities, and/or the client's sensitivity to tax obligations. System 300 may also initially set a default sensitivity index based on an average sensitivity value among other clients having similar profiles (e.g., based on the client questionnaire). The sensitivity index may include a relative weight, such as a single numerical value or qualitative value (e.g., high, medium, low, etc.), configured to represent the overall likelihood of the client to invest in securities based on investment risk or other sensitivity parameters as an investment strategy.

System 300 may generate an initial association matrix listing the client interests from the questionnaire, as well as, where available, an indication of the relative strength or importance of each interest. System 300 may also generate an association index. The association index may include a relative weight, such as a single numerical value or qualitative value (e.g., high, medium, low, etc.), configured to represent the overall likelihood of the client to invest in securities based on personal interests as an investment strategy, as indicated by the client via the client questionnaire.

Based on the familiarity matrix (306), the specialist opinions (308), the expert portfolio strategies (310), and the sensitivity and/or association matrices (314), system 300 may determine an initial set of profitable recommendations for the client (316). For example, system 300 may determine an initial set of most-profitable investment opportunities (e.g., highest projected ROI), and then compare those to the parameters of the client profile to identify any strong conflicts or contradictions. As one illustrative example, system 300 may identify "Security A" having a 5% expected return. However, the client has indicated a negative experience with Security A or another factor making it likely for the client to sell off the investment in the short term. Accordingly, system 300 may replace Security A with similar "Security B," which has only a 4.5% expected return, but which the client is more likely to retain for an extended period of time.

In some examples, system 300 may be configured to receive additional data input regarding one or more securities. For example, system 300 may be configured to receive holding data (318). Holding data may include comprehensive data describing one or more securities currently or previously held by the client. Holding data may include, as non-limiting examples, an economic sector (e.g., technology field) of a security, the names of officers (e.g., CEO, etc.) of a security, demographic information of individuals (e.g., board of directors, employees) employed by a security, geographic regions associated with a security, charitable causes supported by a security, a carbon footprint associated with a security, or any other publicly available information regarding a security.

In some examples, system 300 may be configured to receive data indicative of historical security relationships (320) and market data (322). The historical security relationships may indicate one or more relationships between two securities. For example, the relationships may indicate whether two or more economic entities (e.g., corporations, etc.) have historically been competitors or collaborators. The relationships may indicate a common employee between the two companies, such as whether a former director or officer of a company from one security now works at a company of another security. Market data may indicate, for example, each security's proportional share of the respective market to which it belongs. Based on the holding data (320), the security relationships (322), and the market data (324), system 300 may construct a graph or "cloud" illustrating the relationships, similarities, or associations (e.g., an association cloud) among the various securities.

Based on the association cloud, system 300 may update the association matrix within the client profile (324). For example, association unit 216 (FIG. 2) may receive the holding data, the historical security relationships, and the market data as input in order to identify one or more patterns within the client's historical investment behavior. For example, association unit 216 may identify that the client has a tendency to invest in securities having a common property or trait. In some examples, association unit 216 (FIG. 2) may identify investment patterns which even the client is not consciously aware of himself. The association matrix may include a list of these patterns or tendencies, as well as a respective ranking indicating the relative strength or frequency of each of these behaviors.

System 300 may include a trade engine 112 (FIG. 2) configured to determine a finalized set of recommended investment opportunities for the client (326). For example, trade engine 112 may use the initial set of recommended investments (316), and then consult the client's association index to identify additional or alternative securities that are "similar" to the initial set with regard to at least one identified client association within the parameters of the association matrix.

In some examples, system 300 includes a data format unit 118 (FIG. 2) configured to customize the formatting of the recommended investments and output them for display to the client (328). In some examples, data format unit 118 (FIG. 2) may include, along with the recommendation, a statement of a justification for the recommendation, wherein the justification indicates the association between the recommended investment and the client. As one non-limiting example, the justification may include a statement indicating to the client that, "We recommend this investment because you have previously shown an interest in securities involved in renewable energy projects." In some examples, upon identifying a particular recommended investment, data format unit 118 may assign a relative ranking to the respective investment, indicating the likelihood of the client to accept the recommendation. For example, data format unit 118 may base the relative ranking on the number and strength of the parameters and/or the indices that factored into its selection, as well as its projected return on investment. Data format unit 118 may then output the set of recommended investments in an order indicated by the relative ranking of each investment.

If the recommended investments are to be displayed directly to the client via user device 116, data format unit 118 may format the recommended investments to include a more user-friendly layout, such as to remove some of the technical or analytical details of the investments. If the recommended investments are to be displayed on the financial advisor computing device 108 while the financial advisor meets with the client, data format unit 118 may include more of the more technical aspects of the investments, such that the financial advisor may explain them to the client if necessary.

In some examples, system 300 may include a binary "accept" option and a "reject" input option for each respective recommended investment (330). In other examples, system 300 may allow the client to select at least one recommended investment from among a group of alternative recommended investments.

For any recommended investments that the client accepts (YES of 330), system 300 may prepare an investment report and update the system (e.g., the client profile or other data stored in memory) to reflect the client's decisions (332), and in some examples, automatically conduct the trades accepted by the client.

For example, system 300 may cause familiarity unit 214 (FIG. 2) to update the client familiarity matrix and/or the familiarity index (334). For example, system 300 may add any accepted recommendations including new securities to the list of "familiar" securities within the familiarity matrix. System 300 may also increase the relative rating of any accepted recommended investments that include securities already represented within the familiarity index.

In some examples, system 300 may cause association unit 216 (FIG. 2) to update the client association matrix and/or the association index based on the accepted recommendations. For example, the accepted recommendations may be fed back into the association model such that the association model may either identify new patterns within the client's investment decisions, or bolster or weaken existing associations (e.g., adjust the relative rankings accordingly).

In some examples, system 300 may cause association unit 216 to update the association matrix based on client comments during the advising meeting, such as a monthly or quarterly advising meeting, at which the financial advisor presents the investment recommendations to the client. During the advising meeting, the financial advisor may record the meeting or take written notes while discussing the recommendations with the client. The written or recorded notes may be fed as data input into association unit 216, such that the model may identify associations, such as interests or other patterns, within the client's questions and comments during the advising meeting. Once client profile unit 110 (FIG. 2) has updated the familiarity matrix and/or the client association matrix within the client profile, trade engine 112 may be re-run to identify further recommended investments based on the updated client profile (326).

In some examples, system 300 is configured to identify (e.g., determine, indicate, or quantify) an investment advisor bias (336). For example, system 300 may be configured to determine, based on the familiarity matrix and/or the client's past investment history, whether the client's investment advisor, such as a portfolio manager (PM), tends to recommend one particular security significantly more frequently than other securities. System 300 may particularly identify an advisor bias where the advisor's advice runs contrary to received expert advice (310). If system 300 identifies an advisor bias, system 300 may store an indication of the bias within trade engine 112. System 300 may use the stored bias data to inform the advisor (or other portfolio manager or central financial advising body) of the bias so that the bias may be reduced or otherwise accounted for in subsequent advising meetings. In some examples, but not all examples, after identifying an advisor bias, trade engine 112 may be configured to automatically account for the advisor bias when generating the set of recommended investment opportunities. For example, trade engine 112 may be configured to reduce a relative recommendation ranking for a security by an amount proportional to the relative strength of an identified bias.

For any recommendations that the client rejects ("NO" of 330), or equivalently, for any alternate recommendation options that the client does not elect, system 300 may store in memory an indication of the rejected (or un-elected) trades. Additionally, for each rejected trade, the sensitivity unit 218 (FIG. 2) may distinguish between the rejected trades and the accepted trades and update the sensitivity matrix based on the identified difference (338). For example, sensitivity unit 218 may determine that the rejected trades each included a higher projected volatility or a lower expected performance than the accepted trades. Accordingly, sensitivity unit 218 may update those sensitivity parameters within the sensitivity matrix. Once system 300 has updated the sensitivity matrix within the client profile, trade engine 112 may be re-run to identify further recommended investments based on the updated client profile (326).

Figure 4:
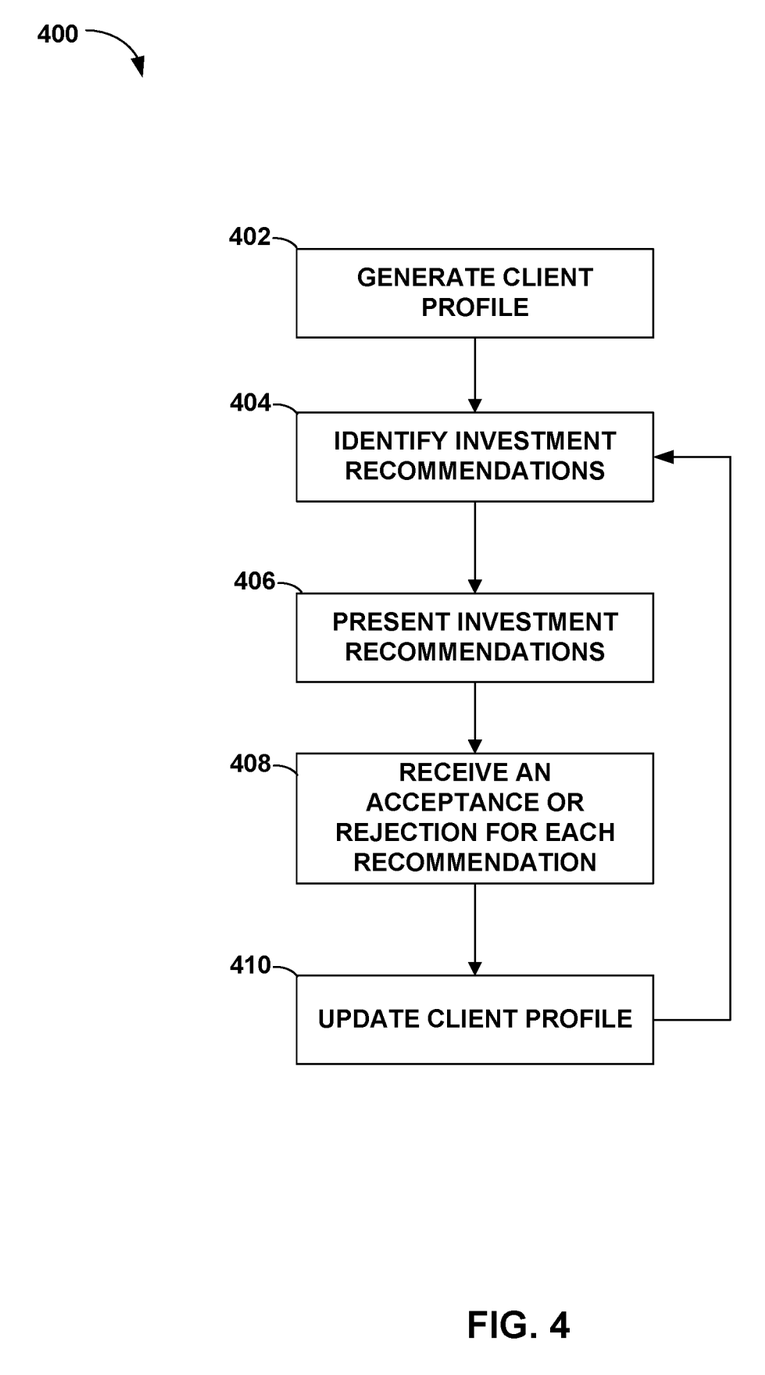
FIG. 4 is a flowchart illustrating an example operation in accordance with techniques of this disclosure.

FIG. 4 is a flowchart depicting an example operation 400 in accordance with techniques of this disclosure. A computing system (e.g., computing system 108 of FIGS. 1 and 2) may generate a client profile (402). For example, the system may develop a client profile having at least three sets of parameters configured to characterize an investment behavior of a client: a set of familiarity parameters indicating historical investment trades made by the client and/or rejected by the client; a set of association parameters indicating subjects of personal relevance to the client; and a set of sensitivity parameters indicating the client's expectations for, and/or constraints on, "acceptable" investment environments. The client profile may also include, for each set of parameters, a respective index indicating a relative importance to the client of the corresponding aspect of his investment portfolio when selecting future investments.

Based on the client profile and expert investment advice, the system identifies, from a pool of potential investment opportunities (e.g., an expert-recommended set of estimated profitable investments) a customized set of alternative investment opportunities for the client (404). For example, the system may attempt to capture expert advisors' advice by balancing among return and risk trade-offs of various investments opportunities. This process may generate a solution space including a plurality of different investment choices with similar characteristics and forecasted performance. In some examples, a wealth utility function may identify a single solution (e.g., investment portfolio) that best fits client's psychological profile.

The system may present (e.g., output for display) the trade recommendations in a manner that supports the client's intent for investing and made relevant to client (406). For example, although there may be a plurality of factors behind the inclusion of each investment option within the set, the system may output an indication of those reasons that are more uniquely relevant to client, in order to put personal context around each decision to reduce ambiguity around choices and clarify associations with client goals. Accordingly, a reporting dashboard may collate answers and reveal choices in accordance with the client profile.

The system may subsequently receive an acceptance or a rejection for each investment recommendation (408). For example, during an investment meeting to discuss the various investment options, the client may indicate a binary acceptance or rejection, or in some examples, select one or more from a set of alternative recommendations.

In some examples, the client's interaction with the various investment choices may reveal further preferences and sensitivities to various key changes in portfolios. For example, the client may comment on one or more of the recommended investments, indicating a reason or rationale for accepting or rejecting the recommendation. Based on the client's choices and indications of trade preferences, the system may update the client profile (410). For example, the system may recalibrate the parameters and indices within the client profile and identify a new set of recommended investments (404) based on the updated client profile.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some respects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
creating sets of training data that include historical investment data for a general population of clients;
building first, second, and third machine-learning models of a computing system based on the sets of training data;
receiving, by the computing system and from a computing device, client data for a client that includes data representative of answers to a client questionnaire and historical investment data of the client, wherein the historical investment data of the client reflects investment recommendations made by an investment advisor;
determining, as output from the first machine-learning model of the computing system, a familiarity index for the client based on a set of familiarity parameters determined from the client data for the client and input to the first machine-learning model that indicate commercial entities with which the client has previously invested and relative rankings indicating a relative amount of experience the client has with each of the commercial entities;
determining, as output from the second machine-learning model of the computing system, an association index for the client based on a set of association parameters determined from the client data for the client and input to the second machine-learning model that indicate subjects of personal relevance to the client;
determining, as output from the third machine-learning model of the computing system, a sensitivity index for the client based on a set of sensitivity parameters determined from the client data for the client and input to the third machine-learning model that indicate the client's tolerance for various financial-related factors of investments;
generating, by the computing system, a client profile for the client that includes a risk perception matrix, the risk perception matrix comprising the familiarity index, the association index, and the sensitivity index, wherein each of the familiarity index, the association index, and the sensitivity index indicates a relative weight of the corresponding set of parameters relative to the other two sets of parameters as a factor in the client's perception of investment risk;
determining, by the computing system and based on the investment recommendations made by the investment advisor as reflected by the historical investment data of the client and the familiarity index for the client, a relative bias associated with investment recommendations made by the investment advisor, wherein determining the relative bias includes determining that investment recommendations made by the investment advisor run contrary to expert advice;
identifying, by a recommendation model of the computing system, one or more investment recommendations that the client would perceive to be low-risk from a pool of potential investments based on the risk perception matrix for the client, wherein identifying the one or more investment recommendations includes adjusting for the relative bias associated with investment recommendations made by the investment advisor;
outputting, by the computing system, data representative of a user interface for display on the computing device, the data representative of the user interface comprising the one or more investment recommendations for the client in an order determined based at least on the association parameters;
receiving, by the computing system and from the computing device via the user interface, one of an acceptance or a rejection for each of the one or more investment recommendations;
updating, by at least one of the first, second, or third machine-learning models, at least one of the familiarity index, the association index, or the sensitivity index based on accepted investment recommendations and rejected investment recommendations; and
conducting a trade, by the computing system, in response to receiving the acceptance or the rejection for each of the one or more investment recommendations, wherein conducting the trade includes communicating with an external system over a network.

2. The method of claim 1, wherein determining the familiarity index comprises determining the familiarity parameters based at least on the client questionnaire and an investment history of the client determined from the historical investment data of the client.

3. The method of claim 1, wherein the relative amount of experience the client has with each of the commercial entities comprises an amount of money invested with each commercial entity or a duration of investments with each commercial entity.

4. The method of claim 1, wherein updating the familiarity index comprises:
updating the familiarity parameters based on the accepted investment recommendations; and
updating, using the first machine-learning model, the familiarity index based on the updated familiarity parameters.

5. The method of claim 1,
wherein determining the association index comprises determining the association parameters based on at least the client questionnaire and data representative of an investment advising discussion with the client received as part of the client data.

6. The method of claim 1, wherein the subjects of personal relevance to the client captured by the association parameters comprise:
a field of interest to the client;
a source of wealth of the client;
a value of the client;
a geographic region associated with the client;
a belief of the client; or
a social identification of the client; and
wherein the association parameters further capture a relative ranking for each subject of personal relevance, the relative ranking indicating a relative importance of each subject to the client.

7. The method of claim 1, wherein updating the association index comprises:
identifying, using the second machine-learning model, additional subjects of personal relevance to the client based on the accepted investment recommendations and subsequent investment advising discussions with the client;
updating the association parameters based on the additional subjects of personal relevance; and
updating, using the second machine-learning model, the association index based on the updated association parameters.

8. The method of claim 1,
wherein determining the sensitivity index comprises determining the sensitivity parameters based on at least the client questionnaire and average sensitivity parameters across the general population of clients.

9. The method of claim 1, wherein the sensitivity parameters indicate:
a sensitivity to various investment environments;
a sensitivity to a relative performance of a security; or
a sensitivity to payment of taxes.

10. The method of claim 1, wherein updating the sensitivity index comprises:
updating the sensitivity parameters based on the rejected investment recommendations; and
updating, using the third machine-learning model, the sensitivity index based on the updated sensitivity parameters.

11. The method of claim 1, wherein outputting the one or more investment recommendations for the client comprises:
customizing a format of the one or more investment recommendations based on an intended viewer; and
outputting for display via the user interface the one or more investment recommendations in the customized format.

12. The method of claim 11, wherein the intended viewer comprises the client, and wherein customizing the format comprises removing technical financial details from the one or more investment recommendations to simplify the format.

13. The method of claim 11, wherein the intended viewer comprises an investment advisor, and wherein customizing the format comprises including technical financial details with the one or more investment recommendations.

14. A first computing device comprising:
one or more storage units; and
one or more processors in communication with the one or more storage units and configured to:
create sets of training data that include historical investment data for a general population of clients;
build first, second, and third machine-learning models of the first computing device based on the sets of training data;
receive, from a second computing device, client data for a client that includes data representative of answers to a client questionnaire and historical investment data of the client, wherein the historical investment data reflects investment recommendations made by an investment advisor;
determine, as output from the first machine-learning model of the first computing device, a familiarity index for the client based on a set of familiarity parameters determined from the client data for the client and input to the first machine-learning model that indicate commercial entities with which the client has previously invested and relative rankings indicating a relative amount of experience the client has with each of the commercial entities;
determine, as output from the second machine-learning model of the first computing device, an association index for the client based on a set of association parameters determined from the client data for the client and input to the second machine-learning model that indicate subjects of personal relevance to the client;
determine, as output from the third machine-learning model of the first computing device, a sensitivity index for the client based on a set of sensitivity parameters determined from the client data for the client and input to the third machine-learning model that indicate the client's tolerance for various financial-related factors of investments;
generate a client profile for the client that includes a risk perception matrix, the risk perception matrix comprising the familiarity index, the association index, and the sensitivity index, wherein each of the familiarity index, the association index, and the sensitivity index indicates a relative weight of the corresponding set of parameters relative to the other two sets of parameters as a factor in the client's perception of investment risk;
determine, based on the investment recommendations made by the investment advisor as reflected by the historical investment data of the client and the familiarity index for the client, a relative bias associated with investment recommendations made by the investment advisor, wherein determining the relative bias includes determining that investment recommendations made by the investment advisor run contrary to expert advice;
identify, via a recommendation model of the first computing device, one or more investment recommendations that the client would perceive to be low-risk from a pool of potential investments based on the risk perception matrix for the client, wherein to identify the one or more investment recommendations, the one or more processors adjust for the relative bias associated with investment recommendations made by the investment advisor;
output data representative of a user interface for display on the second computing device, the data representative of the user interface comprising the one or more investment recommendations for the client in an order determined based at least on the association parameters;
receive, from the second computing device via the user interface, one of an acceptance or a rejection for each of the one or more investment recommendations;
update, via at least one of the first, second, or third machine-learning models, at least one of the familiarity index, the association index, and the sensitivity index based on accepted investment recommendations and rejected investment recommendations; and
conduct a trade in response to receiving the acceptance or the rejection for each of the one or more investment recommendations, wherein to conduct the trade, the one or more processors communicate with an external system over a network.

15. The first computing device of claim 14, wherein, to determine the familiarity index, the one or more processors are configured to determine the familiarity parameters based at least on the client questionnaire and an investment history of the client determined from the historical investment data of the client.

16. The first computing device of claim 14,
wherein to determine the association index, the one or more processors are configured to determine the association parameters based on at least the client questionnaire and data representative of an investment advising discussion with the client received as part of the client data;
wherein the subjects of personal relevance to the client captured by the association parameters comprise:
a field of interest to the client;
a source of wealth of the client;

a value of the client;
a geographic region associated with the client;
a belief of the client; or
a social identification of the client; and
wherein the association parameters further capture a relative ranking for each subject of personal relevance, the relative ranking indicating a relative importance of each subject to the client.

17. The first computing device of claim 14,
wherein to determine the sensitivity index, the one or more processors are configured to determine the sensitivity parameters based on at least the client questionnaire and average sensitivity parameters across the general population of clients; and
wherein the sensitivity parameters indicate:
a sensitivity to various investment environments;
a sensitivity to a relative performance of a security; or
a sensitivity to payment of taxes.

18. A non-transitory computer-readable storage medium having stored thereon instructions that, when executed, cause one or more processors of a first computing device to:
create sets of training data that include historical investment data for a general population of clients;
build first, second, and third machine-learning models of the first computing device based on the sets of training data;
receive, from a second computing device, client data for a client that includes data representative of answers to a client questionnaire and historical investment data of the client, wherein the historical investment data reflects investment recommendations made by an investment advisor;
determine, as output from the first machine-learning model, a familiarity index for the client based on a set of familiarity parameters determined from the client data for the client and input to the first machine-learning model that indicate commercial entities with which the client has previously invested and relative rankings indicating a relative amount of experience the client has with each of the commercial entities;
determine, as output from the second machine-learning model, an association index for the client based on a set of association parameters determined from the client data for the client and input to the second machine-learning model that indicate subjects of personal relevance to the client;
determine, as output from the third machine-learning model, a sensitivity index for the client based on a set of sensitivity parameters determined from the client data for the client and input to the third machine-learning model that indicate the client's tolerance for various financial-related factors of investments;
generate a client profile for a client that includes a risk perception matrix, the risk perception matrix comprising the familiarity index, the association index, and the sensitivity index, wherein each of the familiarity index, the association index, and the sensitivity index indicates a relative weight of the corresponding set of parameters relative to the other two sets of parameters as a factor in the client's perception of investment risk;
determine, based on the investment recommendations made by the investment advisor as reflected by the historical investment data of the client and the familiarity index for the client, a relative bias associated with investment recommendations made by the investment advisor, wherein determining the relative bias includes determining that investment recommendations made by the investment advisor run contrary to expert advice;
identify, via a recommendation model of the first computing device, one or more investment recommendations that the client would perceive to be low-risk from a pool of potential investments based on the risk perception matrix for the client, wherein to identify the one or more investment recommendations, the one or more processors adjust for the relative bias associated with investment recommendations made by the investment advisor;
output data representative of a user interface for display on the second computing device, the data representative of the user interface comprising the one or more investment recommendations for the client in an order determined based at least on the association parameters;
receive, from the second computing device via the user interface, one of an acceptance or a rejection for each of the one or more investment recommendations;
update, via at least one of the first, second, or third machine-learning models, at least one of the familiarity index, the association index, and the sensitivity index based on accepted investment recommendations and rejected investment recommendations; and
conduct a trade in response to receiving the acceptance or the rejection for each of the one or more investment recommendations, wherein conducting the trade includes communicating with an external system over a network.

\* \* \* \* \*